(12) United States Patent
Turchi et al.

(10) Patent No.: US 11,493,203 B2
(45) Date of Patent: Nov. 8, 2022

(54) GAS BURNER ASSEMBLY AND GAS COOKING APPLIANCE COMPRISING AT LEAST ONE GAS BURNER ASSEMBLY

(71) Applicant: ELECTROLUX APPLIANCES AKTIEBOLAG, Stockholm (SE)

(72) Inventors: Marco Turchi, Forli (IT); Riccardo Eusepi, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 26 days.

(21) Appl. No.: 17/253,264

(22) PCT Filed: Jun. 13, 2019

(86) PCT No.: PCT/EP2019/065531
§ 371 (c)(1),
(2) Date: Dec. 17, 2020

(87) PCT Pub. No.: WO2020/001995
PCT Pub. Date: Jan. 2, 2020

(65) Prior Publication Data
US 2021/0270458 A1 Sep. 2, 2021

(30) Foreign Application Priority Data
Jun. 25, 2018 (EP) .................................... 18179603

(51) Int. Cl.
*F23D 14/06* (2006.01)
*F24C 3/08* (2006.01)

(52) U.S. Cl.
CPC ............ *F23D 14/065* (2013.01); *F24C 3/085* (2013.01); *F23D 2209/20* (2013.01); *F23D 2900/14062* (2013.01)

(58) Field of Classification Search
CPC ....... F23D 2900/14062; F23D 2209/20; F23D 14/065; F24C 3/085
(Continued)

(56) References Cited

U.S. PATENT DOCUMENTS 6,263,868 B1 7/2001 Koch et al.
6,322,354 B1 11/2001 Carbone et al.
(Continued)

FOREIGN PATENT DOCUMENTS

DE 102004017308 10/2005
EP 1838997 10/2007
(Continued)

OTHER PUBLICATIONS

International Search Report and Written Opinion for PCT/EP2019/065531 dated Aug. 16, 2019, 9 pages.

*Primary Examiner* — Vivek K Shirsat
(74) *Attorney, Agent, or Firm* — Pearne & Gordon LLP (57) ABSTRACT

The present invention relates to a gas burner assembly (10), in particular for a gas cooking appliance, preferably for a domestic gas cooking hob. The present invention further relates to such a gas cooking appliance comprising at least one gas burner assembly (10). The gas burner assembly (10) comprises a burner head (12) including a plurality of high-power flame ports (32). The gas burner assembly (10) comprises at least one intermediate element (14, 16) including a plurality of low-power flame ports (38). The burner head (12) is arranged above the at least one intermediate element (14, 16). The high-power flame ports (32) are connected to a first gas inlet (30) via a horizontal Venturi pipe (22). The low-power flame ports (38) are connected to a second gas inlet (52) via an annular distribution chamber (46). The low-power flame ports (38) and the high-power flame ports (32) are located on different parts of the gas burner assembly (10) and arranged in super-imposed way.

(Continued)

According to a first aspect of the invention, the gas burner assembly (10) comprises at least one base part (20) arranged beneath the at least one intermediate element (14, 16), wherein at least one low-power injector (18), at least one pre-mixing chamber (48) and preferably the second gas inlet (52) are integrated within said base part (20). According to a second aspect of the invention, the gas burner assembly (10) is arranged in the gas cooking appliance in that way that the primary fresh air for the high-power flame ports (32) is sucked from the bottom side and the primary fresh air for the low-power flame ports (38) is sucked from the top side of a work plate (54) of the gas cooking appliance.

20 Claims, 4 Drawing Sheets

(58) Field of Classification Search
USPC .............................................. 126/39 E, 39 R
See application file for complete search history.

(56) References Cited

U.S. PATENT DOCUMENTS

| | | | |
|---|---|---|---|
| 8,845,326 B2* | 9/2014 | Shaffer | F23D 14/06 |
| | | | 431/18 |
| 2006/0051718 A1 | 3/2006 | Kamal et al. | |
| 2007/0059654 A1* | 3/2007 | Armanni | F24C 3/085 |
| | | | 431/8 |

FOREIGN PATENT DOCUMENTS

| | | |
|---|---|---|
| JP | 2000088214 | 3/2000 |
| JP | 2002228118 | 8/2002 |
| WO | 2016170497 | 10/2016 |
| WO | 2016184922 | 11/2016 |

\* cited by examiner

GAS BURNER ASSEMBLY AND GAS COOKING APPLIANCE COMPRISING AT LEAST ONE GAS BURNER ASSEMBLY

The present invention relates to a gas burner assembly for a gas cooking appliance, preferably for a domestic gas cooking hob. Further, the present invention relates to a gas cooking appliance comprising at least one gas burner assembly.

Gas burner assemblies should be able to provide a high power rate as well as very low power rate. The high power rate is used for a fast cooking process. The low power rate is required for a soft and slow cooking of some type of foods. The gas burner assemblies on the current market achieve the high and low power rates by the use of different rings of flames and are therefore limited to obtain flexible ranges of power rates from higher to lower. These common gas burner assemblies are able to draw or suck air only from the bottom side of the gas cooking appliance. For this reason, the gas inlet feeding the ring of low-power flames takes primary air commonly from the bottom side of the gas cooking appliance. However, there is a potential risk that streaming and suction phenomena occur, which can affect negatively the safety of the gas cooking appliance due to instability of the burner when operating with low power. The most of the gas cooking appliance on the market install gas burner assemblies able to generate only high power rates, but the capability to generate low power rates is limited.

EP 1 838 997 B1 discloses a gas burner assembly with two horizontal Venture pipes. The primary is taken air from the bottom side of the work plate. Two rings of flames are arranged at the same level.

WO 2016/184922 A1 discloses a gas burner assembly generating vertical flames. Three horizontal Venture pipes are supplied with gas by three nozzles, wherein the primary is taken air from the bottom side of the work plate.

WO 2016/170497 A1 discloses a gas burner assembly generating two concentric rings of flames arranged at the same level. Said rings of flames are supplied by two horizontal Venture pipes taking primary air from the bottom side of the work plate.

It is an object of the present invention to provide a gas burner assembly, which allows the generation of high-power flames and low-power flames by low complexity.

A gas burner assembly, in particular for a gas cooking appliance, preferably for a domestic gas cooking hob, is provided, wherein:
  the gas burner assembly comprises a burner head including a plurality of high-power flame ports,
  the gas burner assembly comprises at least one intermediate element including a plurality of low-power flame ports,
  the burner head is arranged above the at least one intermediate element,
  the high-power flame ports are connected to a first gas inlet via a horizontal Venturi pipe, and
  the low-power flame ports are connected to a second gas inlet via an annular distribution chamber, so that
  the low-power flame ports and the high-power flame ports are located on different parts of the gas burner assembly and arranged in super-imposed way.

According to the present invention, the gas burner assembly comprises at least one base part arranged beneath the at least one intermediate element, wherein at least one low-power injector is integrated within said base part. Further, preferably also at least one pre-mixing chamber and/or the second gas inlet are integrated within said base part.

Preferably, the burner head is made of materials having high flame resistance. For example, the burner head in the environment of the ports is made of brass alloy, while the other components located beneath are made of aluminium alloy. The frame may be also made of aluminium alloy. The at least one intermediate element and/or the burner head may be made by a die-casting or a forging process. The at least one intermediate element and the burner head may be of a circular shape and may have a same or approximately same diameter.

The core of the present invention according to its first aspect is that the gas burner assembly includes two or more gas inlets feeding at least two groups of flames, e.g. flame rings, or two groups of flame ports, respectively. The two groups of flames may be selectively fed by regulating gas valves in order to get flames operating at the maximum power through both groups of flames. By gas feeding with both gas inlets the gas burner assembly can operate with maximum power rate using both superimposed groups of flames. By feeding with only the lower group of flames a low power rate for the gas burner assembly is obtained. The gas burner assembly may be able to work in all power levels of the power spectrum. The horizontal Venturi feeds the high-power flame ports and may be designed as a bigger component or device.

Advantageously, the at least one low-power injector and preferably the at least one pre-mixing chamber and/or the second gas inlet are integrated within said base part, which is a one piece component, i.e. the at least one low-power injector and preferably the at least one pre-mixing chamber and/or the second gas inlet may be integrally formed with the base part.

The base part may be provided to house both the first gas inlet and the second gas inlet. The first and second gas inlets may be arranged perpendicular to each other.

In particular, a high-power injector is interconnected between the first gas inlet and the horizontal Venturi pipe, while at least one final Venturi section and/or at least one main feeding chamber is or are interconnected between the horizontal Venturi pipe and the high-power flame ports, wherein preferably said final Venturi section is formed as a vertical end portion of a Venturi tube. Additionally or alternatively, at least a lower portion of the final Venturi section may be integrated within the base part. The horizontal Venturi pipe may be connected to the vertical final Venturi section and the main feeding chamber. Preferably, the horizontal Venturi pipe, the vertical final Venturi section and the main feeding chamber form the same duct and allow an efficient mixing of gas and air.

The first gas inlet may feed gas to the high-power injector. With the help of said high-power injector primary fresh air may be drawn or sucked particularly from a bottom side of a work plate, in which the gas burner assembly may be arranged. Said work plate may be a metal work plate.

Further, the at least one low-power injector, the at least one pre-mixing chamber and/or at least one Venturi channel may be interconnected between the second gas inlet and the annular distribution chamber, wherein preferably said Venturi channel is adapted for sucking fresh air from a top side of the work plate, in which the gas burner assembly is arranged or provided to be arranged, via the pre-mixing chamber. Preferably, the Venturi channel is arranged in an at least approximately vertical direction. The Venturi channel may be connected to the annular distribution chamber for feeding it with the gas/air mixture provided or generated in the Venturi channel.

The second gas inlet may feed gas to the low-power injector. With the help of said low-power injector primary fresh air may be drawn or sucked particularly from the top side of a work plate, in particular of a metal work plate.

According to embodiments, the final Venturi section and/or main feeding chamber is or are arranged in a central portion of the gas burner assembly, while the annular distribution chamber and/or the Venturi channel is or are arranged in one or more separated peripheral portions of the gas burner assembly.

Moreover, the horizontal Venturi pipe may be adapted for sucking fresh air from the bottom side of the work plate, in which the gas burner assembly is arranged or is provided to be arranged.

According to a specifically preferred embodiment, the primary fresh air for the high-power flame ports is sucked from the bottom side of the work plate, while the primary fresh air for the low-power flame ports is sucked from the top side of the work plate. This may avoid the risk that the low-power flame can be sucked by the gas burner assembly during operation.

A gas cooking appliance, in particular a domestic gas cooking hob, is provided, which comprises at least one gas burner assembly, wherein:

the gas burner assembly comprises a burner head including a plurality of high-power flame ports,
the gas burner assembly comprises at least one intermediate element including a plurality of low-power flame ports,
the burner head is arranged above the at least one intermediate element and is particularly made of materials having high flame resistance, preferably by brass alloy,
the high-power flame ports are connected to a first gas inlet via a horizontal Venturi pipe, and
the low-power flame ports are connected to a second gas inlet via an annular distribution chamber, so that
the low-power flame ports and the high-power flame ports are located on different parts of the gas burner assembly and arranged in super-imposed way.

The gas cooking appliance particularly comprises at least one gas burner assembly as described above under the first aspect of the invention.

According to the present invention, the gas burner assembly is arranged in that way that the primary fresh air for the high-power flame ports is sucked from a bottom side and the primary fresh air for the low-power flame ports is sucked from a top side of a work plate of the gas cooking appliance.

In particular, at least one low-power injector, at least one pre-mixing chamber and/or at least one Venturi channel is or are interconnected between the second gas inlet and the annular distribution chamber. Preferably said Venturi channel is adapted for sucking fresh air from the top side of the work plate via the pre-mixing chamber.

According to embodiments, the annular distribution chamber and/or the Venturi channel is or are arranged in one or more separated peripheral portions of the said gas burner assembly.

Preferably, the gas burner assembly comprises an upper intermediate element and a lower intermediate element, wherein the annular distribution chamber is arranged between and formed by said upper intermediate element and lower intermediate element. In addition, the low-power flame ports may be also arranged between and formed by the upper and lower intermediate elements.

A specific embodiment of the gas burner assembly or of the gas cooking appliance provides that the at least one base part of the gas burner assembly is arranged or arrangeable below the work plate or flush with the work plate with its topside, which base part comprises at least the at least one low-power injector and the at least one pre-mixing chamber. With such arrangement primary air may be sucked or drawn from the top side of the work plate and may be fed to the Venturi channel. Said Venturi channel may be arranged in at least one of the intermediate elements, preferably in the lower intermediate element.

A preferred embodiment is characterized by an intermediate element, which includes at least one fissure allowing cross-lighting of the high-power flames at the high-power flame ports from the low-power flames at the low-power flame ports, wherein the low-power flames are activated before the high-power flames. Said intermediate element may be the upper intermediate element The Venturi pipe may be movable along its longitudinal axis for adjusting the relation between gas and air of the final gas-air mixture for the high-power flame ports, wherein preferably the Venturi pipe is supported by a frame attached at the base part of the gas burner assembly, which base part is arranged beneath the at least one intermediate element.

In particular, the horizontal Venturi pipe is longitudinally adjustable in order to regulate the quantity of primary air according to the current gas pressure.

Further, the intermediate element, in particular the lower intermediate element, may include a number of pilot low-power flame ports for providing laminar pilot flames in order to stabilise low-power flames from the low-power flame ports, wherein preferably said pilot low-power flame ports and the low-power flame ports are formed at the intermediate element, in particular at the lower intermediate element.

In a similar way, the burner head may include a number of pilot high-power flame ports for providing laminar pilot flames in order to stabilise the high-power flames from the high-power flame ports.

For example, the low-power flame ports are formed as groves on a border of the intermediate element, in particular on the lower intermediate element and/or on the lower side of the upper intermediate element, wherein said grooves extend in a radial direction, so that low-power flames are directed outwardly, and wherein preferably the low-power flame ports and the pilot low-power flame ports are alternatingly formed as groves on the border of the intermediate element, in particular of the lower intermediate element.

In particular, the burner head includes a circular disk on its top and a cylindrical circumferential side wall, wherein the high-power flame ports are inclined and arranged in at least one row enclosing said cylindrical circumferential side wall, so that high-power flames are inclined and directed outwardly, and wherein preferably the high-power flame ports are arranged in an upper row and a lower low enclosing said cylindrical circumferential side wall in each case.

Additionally, a plurality of pilot high-power flame ports may be arranged in a row enclosing the cylindrical circumferential side wall, wherein preferably said pilot high-power flame ports are arranged beneath the high-power flame ports.

Novel and inventive features of the present invention are set forth in the appended claims.

The present invention will be described in further detail with reference to the drawing, in which

Figure 1:
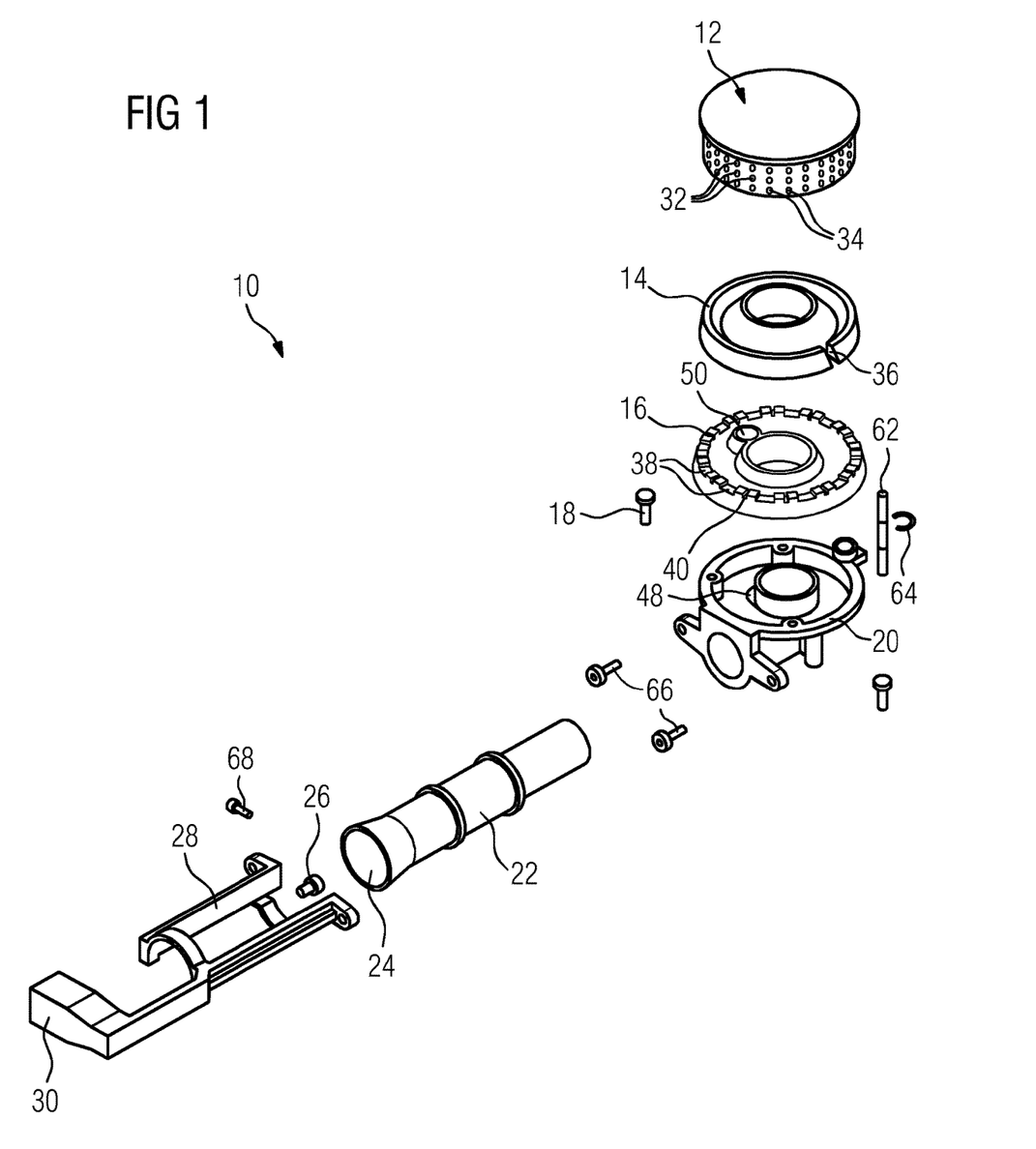
FIG. 1 illustrates a schematic perspective exploded view of a gas burner assembly according to a preferred embodiment of the present invention.

FIG. 1 illustrates a schematic perspective exploded view of a gas burner assembly 10 according to a preferred embodiment of the present invention.

The gas burner assembly 10 comprises a burner head 12, an upper intermediate element 14, a lower intermediate element 16, a base part 20 and a Venturi pipe 22.

The lower intermediate element 16 is arranged above the base part 20. In turn, the upper intermediate element 14 is arranged above the lower intermediate element 16. At last, the burner head 12 is arranged above the upper intermediate element 14.

The burner head 12 is made of different materials. Preferably, the burner head 12 in the environment of the ports is made of brass alloy. The other components located beneath are made of aluminium alloy. The burner head 12 has a higher flame resistance than the other components of the gas burner assembly 10. The burner head 12 includes a circular disk on its top and a cylindrical circumferential side wall. The burner head 12 includes a plurality of high-power flame ports 32 formed in the cylindrical circumferential side wall. In this example, two series of high-power flame ports 32 are formed on top of each other in the cylindrical circumferential side wall. Further, the burner head 12 includes a plurality of pilot high-power flame ports 34 arranged beneath the high-power flame ports 32. The high-power flame ports 32 and the pilot high-power flame ports 34 are formed as holes. In this example, the high-power flame ports 32 and the pilot high-power flame ports 34 are formed as round holes.

The upper intermediate element 14 includes at least one fissure 36 at its outer side. Substantially, the fissure 36 extends vertically. Said fissure is provided as connection canal.

The lower intermediate element 16 includes a plurality of low-power flame ports 38 and a plurality of pilot low-power flame ports 40. The low-power flame ports 38 and the pilot low-power flame ports 40 are formed radial grooves on a border of the lower intermediate element 16. The low-power flame ports 38 and the pilot low-power flame ports 40 are arranged alternatingly.

Further the gas burner assembly 10 comprises a low-power injector 18, a high-power injector 26, a frame 28 and a first gas inlet 30. The Venturi pipe 22 is supported by the frame 28 and connected to the base part 20. The Venturi pipe 22 is adjustable. Preferably, the frame 28 is made of aluminium alloy.

A pre-mixing chamber 48 is formed in the outer portion of the base part 20. A vertical Venturi channel 50 is formed in the outer portion of the lower intermediate element 16.

The upper intermediate element 14 and the lower intermediate element 16 are single elements and connected by screws, preferably by two screws. The burner head 12 is put on the upper intermediate element 14 and lower intermediate element 16 and may be fixed by screws, preferably by two screws.

A pair of screws 66 is provided for fixing the frame 28 to the base part 20. A further screw 68 is provided for fixing adjusted position of the Venturi pipe 22.

Further, the gas burner assembly 10 comprises a spark plug 62 and a spring clip for fixing said spark plug 62. The spark plug 62 is arranged besides the upper intermediate element 14, the lower intermediate element 16 and the base part 20.

Figure 2:
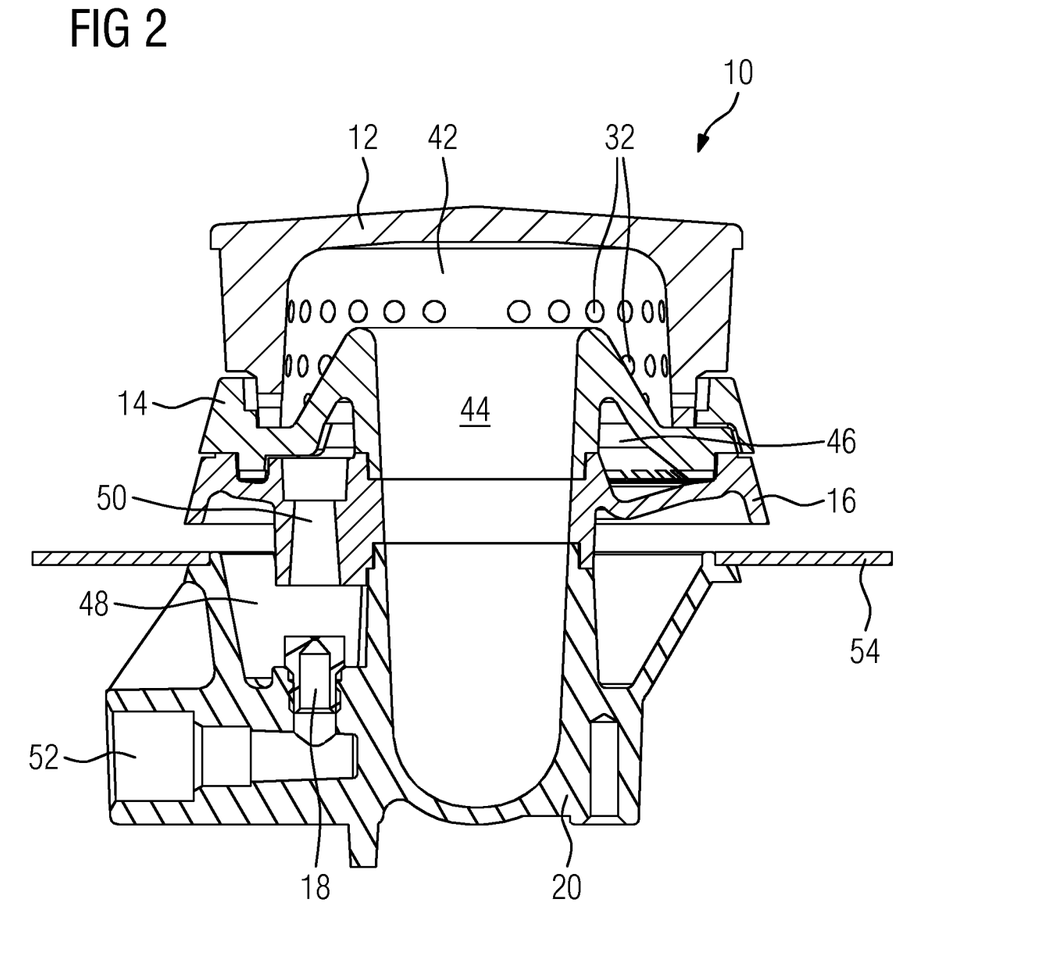
FIG. 2 illustrates a schematic sectional side view of the gas burner assembly according to the preferred embodiment of the present invention.

FIG. 2 illustrates a schematic partial sectional side view of the gas burner assembly 10 according to the preferred embodiment of the present invention.

FIG. 2 clarifies that the lower intermediate element 16 is arranged above the base part 20, the upper intermediate element 14 is arranged above said lower intermediate element 16 and the burner head 12 is arranged above said upper intermediate element 14.

A main feeding chamber 42 is formed inside the burner head 12. A final Venturi section 44 is enclosed by the upper intermediate element 14. Said final Venturi section 44 is the upper portion of the vertical Venturi. The burner head 12 encloses the main feeding chamber 42. From the final Venturi section 44 to the feeding chamber 42 the gas-air mixture expands. The final Venturi section 44 is formed as a vertical end portion of a Venturi tube. A distribution chamber 46 is formed between the outer portions of the upper intermediate element 14 and the lower intermediate element 16. In this example, the distribution chamber 46 has an annular shape. The pre-mixing chamber 48 is formed in the outer portion of the base part 20. The vertical Venturi channel 50 is formed in the outer portion of the lower intermediate element 16. The low-power injector 18 is arranged within the base part 20 and beneath the Venturi channel 50. A second gas inlet 52 is formed in the outer portion of the base part 20.

The gas burner assembly 10 penetrates a cut-out in a work plate 54, wherein the base part 20 is arranged beneath the work plate 54, while the burner head 12, the upper intermediate element 14 and the lower intermediate element 16 are arranged above said work plate 54.

The first gas inlet 30 and the second gas inlet 52 belong to different channels separated from each other. The first gas inlet 30 is connected to the high-power flame ports 32 via one channel, while the second gas inlet 52 is connected to the low-power flame ports 38 via another channel.

Gas is supplied to the second gas inlet 52. Said gas flows out from the low-power injector 18. Fresh primary air is drawn from the top of the appliance and mixed with gas in the pre-mixing chamber 48. The gas-air mixture is speeded up and expanded in the vertical Venturi channel 50 and arrives the distribution chamber 46. From the distribution chamber 46 the gas-air mixture reaches the low-power flame ports 38 and the pilot low-power flame ports 40.

Figure 3:
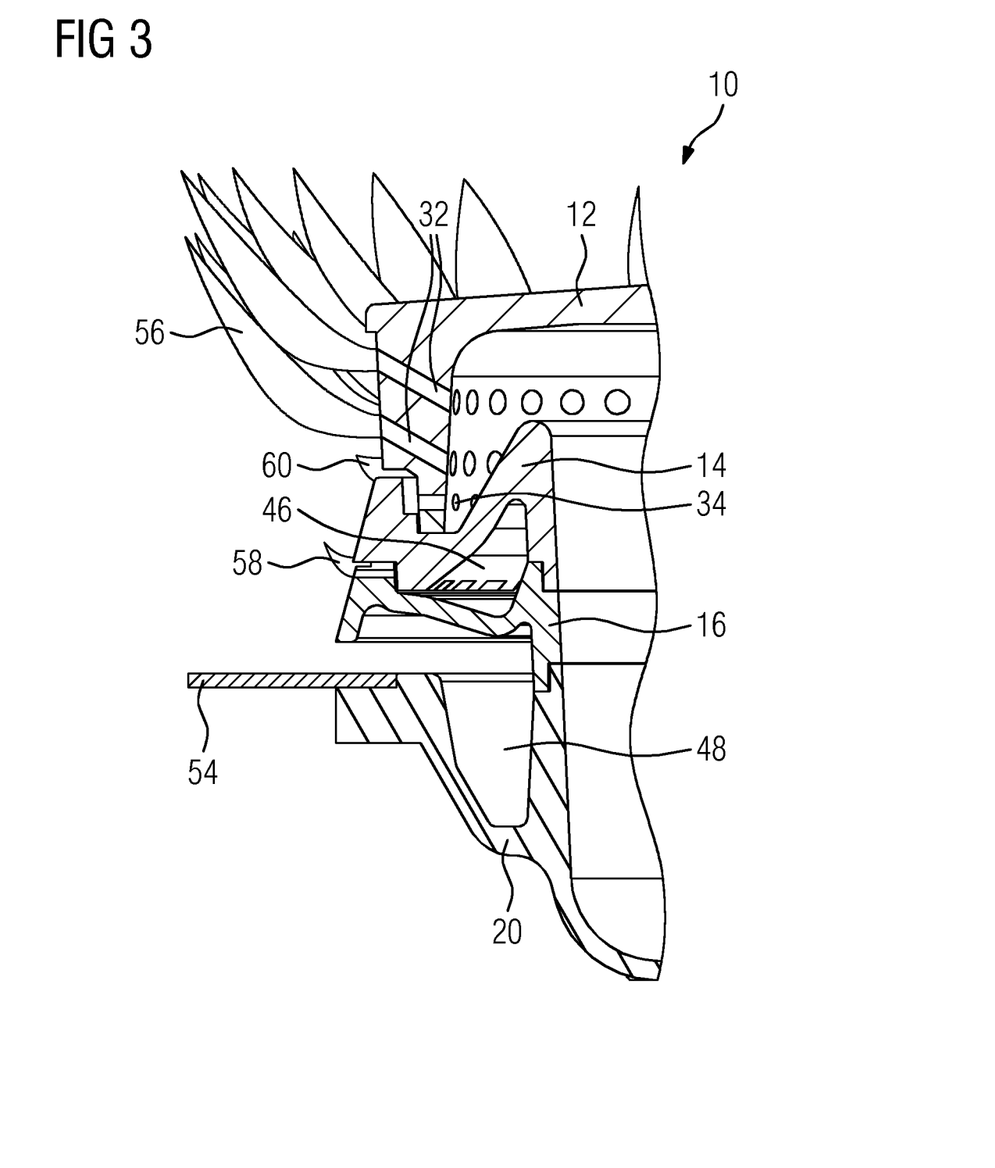
FIG. 3 illustrates a schematic partial sectional side view of the gas burner assembly according to the preferred embodiment of the present invention.

FIG. 3 illustrates a schematic more detailed partial sectional side view of the gas burner assembly 10 according to the preferred embodiment of the present invention.

FIG. 3 shows that the lower intermediate element 16 is arranged above the base part 20, the upper intermediate element 14 is arranged above said lower intermediate element 16 and the burner head 12 is arranged above said upper intermediate element 14.

An annular ring of high-power flames 56 is generated around the burner head 12. Said high-power flames 56 are generated at the high-power flame ports 32 of the burner head 12. An annular ring of low-power flames 58 around the upper intermediate element 14 and lower intermediate element 16. Said low-power flames 58 are generated at the low-power flame ports 38 of the lower intermediate element 16. Pilot flames 60 are generated at the pilot high-power flame ports 34 of the burner head 12.

The first gas inlet 30 supplies the main feeding chamber 42 inside the burner head 12 with gas-air mixture. Said gas-air mixture is used for the annular ring of high-power flames 56 at the high-power flame port 32. Moreover, said gas-air mixture is used for the pilot flames 60 at the pilot high-power flame ports 34. The pilot flames 60 are laminar and give stability to the annular ring of high-power flames 56.

The first gas inlet 30 is arranged at the frame 28. Said frame 28 is fixed at the base part 20 by screws. The first gas inlet 30 takes air from an external gas supply tube through the high-power injector 26. The depression generated by the gas flowing out of the high-power injector 26 draws primary air for forming the gas-air mixture. The mixing of said gas-air mixture is proceeded in the horizontal Venturi pipe 22. The adjustable Venturi pipe 22 allows the regulation of air quantity by moving longitudinally the Venturi pipe 22. The gas-air mixture moving through the horizontal Venturi pipe 22 arrives the vertical Venturi, which is the vertical continuation of the Venturi pipe 22. The quality of the gas-air mixture increases till the final Venturi section 44 and the main feeding chamber 42.

The second gas inlet 52 is arranged aside the first gas inlet 30. The second gas inlet 52 is arranged in the base part 20, while the first gas inlet 30 is arranged on the frame part 28. The second gas inlet 52 extends perpendicular to the high-power injector 26.

The second gas inlet 52 is arranged in an outer portion of the base part 20 and in another level than the low-power injector 18. The second gas inlet 52 feeds gas to the low-power injector 18. The low-power injector 18 is completely accessible from the top of the work plate 54 by removing the upper intermediate element 14, the lower intermediate element 18 and the base part 20 of the gas burner assembly 10. The second gas inlet 52 supplies gas and originates the gas-air mixture drawing primary air in atmospheric way from the top of the work plate 54. Then, the gas-air mixture passes the vertical Venturi channel 50 located in the lower intermediate element 16 and positioned above the low-power injector 18. After that, the gas-air mixture enters the distribution chamber 46 and then the low-power flame ports 38 and the pilot low-power flame ports 40. By this way the annular ring of low-power flames 58 is generated at the alternating low-power flame ports 38 and pilot low-power flame ports 40. This annular ring is fed by the distribution chamber formed also as annular ring. The low-power flames 58 are the only flames ignited when the gas burner assembly is operating at a minimum power.

The gas burner assembly 10 according to the present invention achieves a very high power rate when all rings of flames 56 and 58 are turned on at maximum power and as soon as wanted by the user. The low-power flames 58 are located in the lower portion of the gas burner assembly 10. A low power rate is obtained by switching on only the low-power flames 58 regulating a gas valve. The gas burner assembly 10 provides the effect of cooking with high efficiency and reduced cooking time. The best heating effect is obtained by a compact diameter of the annular ring of flames, which not exceed diameter of the most used cooking vessels. Further, the gas burner assembly 10 reaches the optimum effect in a low-power heating mode by using the ring of the low-power flames 58 in way of obtaining an improved soft and gentle cooking due to the distance between the ring of the low-power flames 58 and the bottom surface of the cooking vessel.

Further, the gas burner assembly 10 according to the present invention provides the high-power due to the compact diameter of the ring of flames 56, 58 and 60. The different series of flame ports 32, 34, 39 and 40 bring out the flames and are able to reach the low power by using only the ring of flames 38 and 40 having a different ring perimeter. The gas burner assembly 10 is able to distribute heating different from the superimposed high-power flames 56. The generated power of the ring of high-power flames 56 is obtained due to an optimal mixture deriving from the horizontal Venturi pipe 22 and the horizontal final Venturi section 44 and the expansion in the main feeding chamber 42. The gas burner assembly 10 generates two overlapping levels of flames, i.e. the low-power flames 58 and the high-power flames 56 with the pilot flames 60. The pilot flames 60 stabilise the high-power flames 56. The low-power flames 58 and the high-power flames 56 are generated by different gas circuits, which do not cross or meet each other. Said different gas circuits work separately and include own gas inlets, injectors and Venturi channels.

Figure 4:
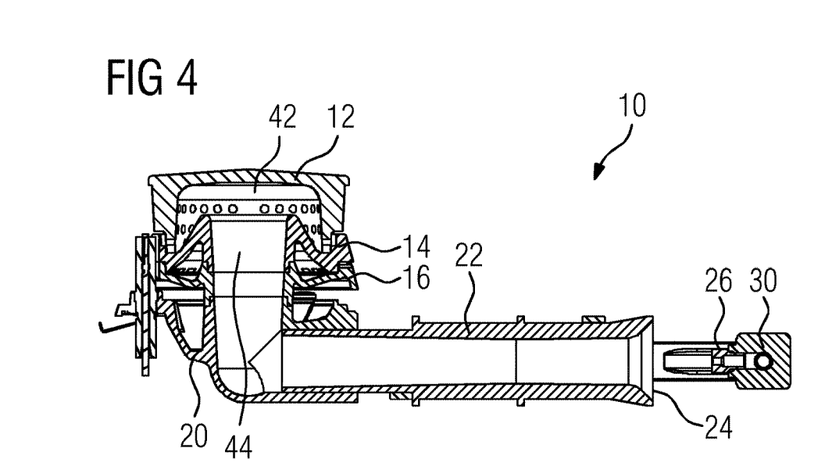
FIG. 4 illustrates a schematic sectional front view of the gas burner assembly according to the preferred embodiment of the present invention.

FIG. 4 illustrates a schematic sectional front view of the gas burner assembly 10 according to the preferred embodiment of the present invention.

The gas burner assembly 10 comprises the burner head 12, the upper intermediate element 14, the lower intermediate element 16, the base part 20 and the Venturi pipe 22. The final Venturi section 44 is enclosed by the upper intermediate element 14. The Venturi pipe 22 extends horizontally, while the final Venturi section 44 extends vertically. Gas is inserted into the first gas inlet 30. The high-power injector 26 spreads the gas into the inlet 24 of the Venturi pipe 22. Primary air is sucked through the inlet 24 into the Venturi pipe 22. The gas-air mixture is formed in the Venturi pipe 22 and in the final Venturi section 44. The gas-air mixture is expanded in the final Venturi section 44 and in the main feeding chamber 42.

The gas burner assembly 12 can operate at the maximum power, when the high-power flames 56 and low-power flames 58 work with maximum flow rate. The maximum power occurs, when the gas valves providing the first gas inlet 30 and the second gas inlet 52 are fully opened. Otherwise, the gas burner assembly 12 can also be operated by regulating the gas valves in order to reduce gradually the gas flow. The high-power flames 56 start with maximum power. When the high-power flames 56 are switched-off by rotating the gas valve, the gas flow is gradually reduced, so that the high-power flames 56 reach their minimum achievable power. One output of the gas valve is completely closed, while another output of said gas valve is partially closed. In this situation the high-power flames 56 are simmering flames, which is the minimum achievable input rate of the whole gas burner assembly 10. When the output of the gas valve feeding the high-power flames 56 is completely closed and said high power flames 56 are completely switched off, then the other output of said gas valve remains completely opened, feeds gas and generates low-power flames 58 at the low-power flame port 38 with maximum power. By rotating a knob of the gas valve, the second output of gas valve is partially closed. By this way, on the low-power flame ports 38 the minimum power is adjustable, which is the lower minimum power achievable on the gas burner assembly 10.

The gas burner assembly 10 gets a wide range of power. The maximum power is obtained by fully operating the high-power flames 56 and the low-power flames 58. The minimum power is obtained by operating only the low-power flame 58, while the high-power flames 56 are switched off.

Figure 5:
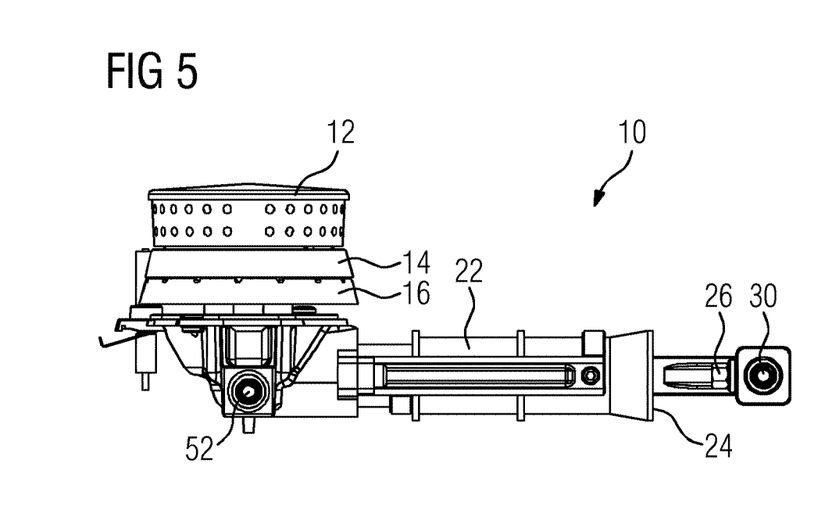
FIG. 5 illustrates a schematic front view of the gas burner assembly according to the preferred embodiment of the present invention.

FIG. 5 illustrates a schematic front view of the gas burner assembly 10 according to the preferred embodiment of the present invention.

The first gas inlet 30 and the second gas inlet 52 belong to different channels. Said channels are always separated from each other. The first gas inlet 30 is connected to the high-power flame ports 32 via one channel, while the second gas inlet 52 is connected to the low-power flame ports 38 via another channel.

Figure 6:
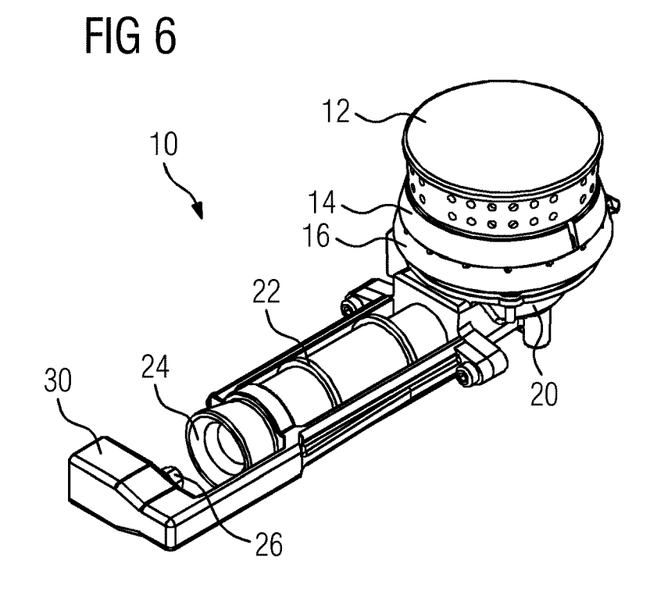
FIG. 6 illustrates a schematic perspective view of the gas burner assembly according to the preferred embodiment of the present invention.

FIG. 6 illustrates a schematic perspective view of the gas burner assembly 10 according to the preferred embodiment of the present invention.

The burner head 12 is arranged above the upper intermediate element 14. In turn, said upper intermediate element 14 is arranged above the lower intermediate element 16, while the lower intermediate element 16 is arranged above the base part 20. The horizontal Venturi pipe 22 is fixed at the base part 20 by screws. Gas is inserted into the first gas inlet 30. The high-power injector 26 spreads said gas into the inlet 24 of the Venturi pipe 22. Simultaneously, primary air is sucked through the inlet 24 into the Venturi pipe 22. The gas-air mixture is formed in the Venturi pipe 22 and in the final Venturi section 44.

The gas burner assembly 10 according to the present invention is installable on free standing cooking ranges and a gas cooking hob. In particular, the gas burner assembly 10 of the present invention is able to cover a complete spectrum of powers, from a maximum high-power level to a minimum low-power level. For some markets, the gas burner assembly 10 should be able to cook at a high power rate, while the same gas burner assembly 10 should also be able to reach low power in order to get light and sweet cooking for some special kinds of cooking recipes. The inventive gas burner assembly 10 has a high ratio between the maximum power and the minimum power obtained by the coaxial rings of flames 56, 58 and 60 positioned within the same structure in a certain distance of superimposing. The structure of the gas burner assembly 10 allows drawing fresh primary air from the bottom side of the work plate 54, wherein a very high power and in the meantime the ring of the low-power flames 58 can operate absolutely safe by taking fresh primary air from top side of the work plate for generating the gas-air mixture due to vertical Venturi channel 50 formed in the lower intermediate element 16. In this way, the primary air feeding the annular ring of low-power flames 58 is not affected by streaming or suction problems deriving from the operation of the first gas inlet 30.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 gas burner assembly
12 burner head
14 upper intermediate element
16 lower intermediate element
18 low-power injector
20 base part
22 Venturi pipe
24 inlet of Venturi pipe
26 high-power injector
28 frame
30 first gas inlet
32 high-power flame port
34 pilot high-power flame port
36 fissure
38 low-power flame port
40 pilot low-power flame port
42 main feeding chamber
44 final Venturi section
46 distribution chamber
48 pre-mixing chamber
50 Venturi channel
52 second gas inlet
54 work plate
56 high-power flames
58 low-power flames
60 pilot flame
62 spark plug
64 spring clip
66 screw for fixing the frame to the base part
68 screw for fixing an adjusted position of the Venturi pipe

The invention claimed is:

1. A gas burner assembly for a gas cooking appliance, comprising:
a burner head including a plurality of high-power flame ports,
at least one intermediate element including a plurality of low-power flame ports, and
at least one base part arranged beneath the at least one intermediate element;
the burner head being arranged above the at least one intermediate element and made of materials having high flame resistance,
the high-power flame ports being connected to a first gas inlet via a horizontal Venturi pipe, and
the low-power flame ports being connected to a second gas inlet via an annular distribution chamber,
wherein the low-power flame ports and the high-power flame ports are located on different parts of the gas burner assembly and arranged in a super-imposed way, -and wherein at least one low-power injector and at least one pre-mixing chamber and/or the second gas inlet is/are integrated within said base part, and
wherein the at least one intermediate element includes at least one fissure allowing cross-lighting of high-power flames at the high-power flame ports from low-power flames at the low high-power flame ports, wherein the low-power flames are activated before the high-power flames.

2. The gas burner assembly according to claim 1, further comprising a high-power injector interconnected between the first gas inlet and the horizontal Venturi pipe, while at least one final Venturi section and/or at least one main feeding chamber is/are interconnected between the horizontal Venturi pipe and the high-power flame ports, said final Venturi section being formed as a vertical end portion of a Venturi tube and/or at least a lower portion of the final Venturi section is integrated within said base part.

3. The gas burner assembly according to claim 1, wherein the at least one low-power injector, the at least one pre-mixing chamber and/or at least one Venturi channel is/are interconnected between the second gas inlet and the annular distribution chamber, wherein said Venturi channel is adapted for sucking fresh air from a top side of a work plate, in which the gas burner assembly is arranged or is adapted to be arranged, via the pre-mixing chamber.

4. The gas burner assembly according to claim 2, wherein the final Venturi section and/or the at least one main feeding chamber is/are arranged in a central portion of the gas burner assembly, while the annular distribution chamber and/or a Venturi channel interconnected between the second gas inlet and the annular distribution chamber is/are arranged in one or more separated peripheral portions of the said gas burner assembly.

5. The gas burner assembly according to preceding claim 1, wherein the horizontal Venturi pipe is adapted for sucking fresh air from a bottom side of a work plate in which the gas burner assembly is arranged or is adapted to be arranged.

6. A gas cooking appliance, comprising at least one gas burner comprising:
a burner head including a plurality of high-power flame ports, and
at least one intermediate element including a plurality of low-power flame ports,
the burner head being arranged above the at least one intermediate element and is made of materials having high flame resistance,
the high-power flame ports being connected to a first gas inlet via a horizontal Venturi pipe,
the low-power flame ports being connected to a second gas inlet via an annular distribution chamber, so that the low-power flame ports and the high-power flame ports are located on different parts of the gas burner assembly and are arranged in super-imposed way,
wherein the at least one the gas burner assembly is arranged so that primary fresh air for the high-power flame ports is sucked from a bottom side of a work plate in which the gas burner assembly is arranged or is adapted to be arranged, and primary fresh air for the low-power flame ports is sucked from the top side of the work plate, and
wherein the at least one intermediate element includes at least one fissure allowing cross-lighting of high-power flames at the high-power flame ports from low-power flames at the low high-power flame ports, wherein the low-power flames are activated before the high-power flames.

7. The gas cooking appliance according to claim 6, wherein at least one low-power injector, at least one pre-mixing chamber and/or at least one Venturi channel is/are interconnected between the second gas inlet and the annular distribution chamber, wherein said at least one Venturi channel is adapted for sucking fresh air from the top side of the work plate via the pre-mixing chamber.

8. The gas cooking appliance according to claim 6, wherein the annular distribution chamber and/or the at least one Venturi channel is/are arranged in one or more separated peripheral portions of the said gas burner assembly.

9. The gas burner assembly according to claim 1, the at least one intermediate element comprising an upper intermediate element and a lower intermediate element, wherein the annular distribution chamber is arranged between and formed by said upper intermediate element and said lower intermediate element.

10. A gas burner assembly for a gas cooking appliance, comprising:
a burner head including a plurality of high-power flame ports,
at least one intermediate element including a plurality of low-power flame ports, and at least one base part arranged beneath the at least one intermediate element
the burner head being arranged above the at least one intermediate element and made of materials having high flame resistance,
the high-power flame ports being connected to a first gas inlet via a horizontal Venturi pipe, and
the low-power flame ports being connected to a second gas inlet via an annular distribution chamber,
wherein the low-power flame ports and the high-power flame ports are located on different parts of the gas burner assembly and arranged in a super-imposed way, and wherein at least one low-power injector and at least one pre-mixing chamber and/or the second gas inlet is/are integrated within said base part, and
wherein the Venturi pipe is movable along its longitudinal axis for adjusting a relation between gas and air of a final gas-air mixture for the high-power flame ports, wherein the Venturi pipe is supported by a frame attached at the at least one base part of the gas burner assembly.

11. A gas burner assembly for a gas cooking appliance, comprising:
a burner head including a plurality of high-power flame ports,
at least one intermediate element including a plurality of low-power flame ports, and
at least one base part arranged beneath the at least one intermediate element
the burner head being arranged above the at least one intermediate element and made of materials having high flame resistance,
the high-power flame ports being connected to a first gas inlet via a horizontal Venturi pipe, and
the low-power flame ports being connected to a second gas inlet via an annular distribution chamber,
wherein the low-power flame ports and the high-power flame ports are located on different parts of the gas burner assembly and arranged in a super-imposed way, and wherein at least one low-power injector and at least one pre-mixing chamber and/or the second gas inlet is/are integrated within said base part, and
wherein the at least one intermediate element includes a number of pilot low-power flame ports for providing laminar pilot flames in order to stabilize low-power flames from the low-power flame ports, wherein said pilot low-power flame ports and the low-power flame ports are formed at the at least one intermediate element.

12. The gas burner assembly according to claim 1, the at least one intermediate element comprising a lower intermediate element and an upper intermediate element, wherein the low-power flame ports are formed as groves on a border of the lower intermediate element and/or on a lower side of the upper intermediate element, wherein said grooves extend in a radial direction so that low-power flames are directed outwardly, and wherein the low-power flame ports and a number of pilot low-power flame ports are alternatingly formed as groves on the border of the lower intermediate element.

13. A gas burner assembly for a gas cooking appliance, comprising:
a burner head including a plurality of high-power flame ports,
at least one intermediate element including a plurality of low-power flame ports, and at least one base part arranged beneath the at least one intermediate element the burner head being arranged above the at least one intermediate element and made of materials having high flame resistance, the high-power flame ports being connected to a first gas inlet via a horizontal Venturi pipe, and the low-power flame ports being connected to a second gas inlet via an annular distribution chamber, wherein the low-power flame ports and the high-power flame ports are located on different parts of the gas burner assembly and arranged in a super-imposed way, and wherein at least one low-power injector and at least one pre-mixing chamber and/or the second gas inlet is/are integrated within said base part, and wherein the burner head includes a circular disk on its top and a cylindrical circumferential side wall, wherein the high-power flame ports are inclined and arranged in at least one row enclosing said cylindrical circumferential side wall so that high-power flames are inclined and directed outwardly, and wherein the high-power flame ports are arranged in an upper row and a lower row enclosing said cylindrical circumferential side wall in each case.

14. The gas burner assembly according to claim 13, wherein a plurality of pilot high-power flame ports are arranged in a row enclosing the cylindrical circumferential side wall, wherein said pilot high-power flame ports are arranged beneath the high-power flame ports.

15. A gas burner assembly for a gas cooking appliance, comprising:
a burner base adapted to be mounted beneath a work plate of the appliance;
a burner head, at least one intermediate part stacked one upon the other above the burner base, and all adapted to be disposed above the work plate, the burner head comprising a perimeter wall at least partially defining a main feeding chamber therein, and a plurality of high-power flame ports disposed in said perimeter wall in fluid communication with said main feeding chamber, the at least one intermediate part defining an annular distribution chamber, and together with said burner base a vertical Venturi passage in fluid communication at an upper end thereof with said main feeding chamber;
a plurality of low-power flame ports formed at a periphery of said at least one intermediate part and being in communication with said annular distribution chamber;
a horizontal Venturi pipe adapted to be disposed beneath said work plate and having an inlet and an outlet, the outlet of the horizontal Venturi pipe communicating with a lower end of said vertical Venturi passage;
a high-power injector adapted to inject a first combustion-fuel stream into said horizontal Venturi pipe through its inlet, such that injection of said first combustion-fuel stream is adapted to induce a first flow of primary fresh air from beneath said work plate through said inlet of said horizontal Venturi pipe, to thereby yield a high-power gas-air mixture;
a vertical Venturi channel having a downward facing inlet and an upward facing outlet communicating with said annular distribution channel; and
a low-power injector adapted to inject a second combustion-fuel stream into the inlet of said vertical Venturi channel such that injection of said second combustion-fuel stream is adapted to induce a second flow of primary fresh air from above said work plate through the inlet of said vertical Venturi channel, to thereby yield a low-power gas-air mixture;

said high-power injector, said horizontal Venturi pipe, said vertical Venturi passage, said main feeding chamber and said high-power flame ports together defining a high-power feeding circuit adapted to sustain high-power flames emanating from said high-power flame ports in-use;

said low-power injector, said vertical Venturi channel, said annular distribution channel and said low-power flame ports together defining a low-power feeding circuit adapted to sustain low-power flames emanating from said low-power flame ports in-use;

said high-power feeding circuit and said low-power feeding circuit being completely isolated from one another, each being independently supplied such that said first combustion fuel stream and said second combustion-fuel stream are independently controllable; and said at least one intermediate part includes at least one fissure allowing cross-lighting of the high-power flames at the high-power flame ports from the low-power flames at the low high-power flame ports, wherein the low-power flames are activated before the high-power flames.

16. The gas burner assembly according to claim 15, said at least one intermediate part comprising an upper intermediate part and a lower intermediate part, said annular distribution chamber being defined between opposing outer portions of said upper and lower intermediate parts, said low-power flame ports being formed at a periphery of said lower intermediate element, said vertical Venturi channel being formed in said lower intermediate element.

17. The gas burner assembly according to claim 10, wherein the at least one intermediate element includes a number of pilot low-power flame ports for providing laminar pilot flames in order to stabilize low-power flames from the low-power flame ports, wherein said pilot low-power flame ports and the low-power flame ports are formed at the at least one intermediate element.

18. The gas burner assembly according to claim 11, wherein the burner head includes a circular disk on its top and a cylindrical circumferential side wall, wherein the high-power flame ports are inclined and arranged in at least one row enclosing said cylindrical circumferential side wall so that high-power flames are inclined and directed outwardly, and wherein the high-power flame ports are arranged in an upper row and a lower row enclosing said cylindrical circumferential side wall in each case.

19. The gas burner assembly according to claim 13, wherein the Venturi pipe is movable along its longitudinal axis for adjusting a relation between gas and air of a final gas-air mixture for the high-power flame ports, wherein the Venturi pipe is supported by a frame attached at the at least one base part of the gas burner assembly.

20. The gas burner assembly according to claim 10, wherein the burner head includes a circular disk on its top and a cylindrical circumferential side wall, wherein the high-power flame ports are inclined and arranged in at least one row enclosing said cylindrical circumferential side wall so that high-power flames are inclined and directed outwardly, and wherein the high-power flame ports are arranged in an upper row and a lower row enclosing said cylindrical circumferential side wall in each case.

* * * * *